US012591038B2

(12) United States Patent
You

(10) Patent No.: US 12,591,038 B2
(45) Date of Patent: Mar. 31, 2026

(54) RADAR CONTROL DEVICE AND METHOD

(71) Applicant: HL KLEMOVE CORP., Incheon (KR)

(72) Inventor: Kyung Jin You, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 513 days.

(21) Appl. No.: 17/899,613

(22) Filed: Aug. 31, 2022

(65) Prior Publication Data

US 2023/0070779 A1     Mar. 9, 2023

(30) Foreign Application Priority Data

Sep. 7, 2021    (KR) ........................ 10-2021-0118990
Aug. 25, 2022   (KR) ........................ 10-2022-0106801

(51) Int. Cl.
  *G01S 7/40*       (2006.01)
  *G01S 13/931*     (2020.01)
            (Continued)

(52) U.S. Cl.
  CPC .............. *G01S 7/40* (2013.01); *G01S 13/931* (2013.01)

(58) Field of Classification Search
  CPC ........ G01S 7/40; G01S 13/931; G01S 7/4021; G01S 13/86; G01S 7/02; G01S 13/4454;
            (Continued)

(56) References Cited

U.S. PATENT DOCUMENTS

| | | | | | |
|---|---|---|---|---|---|
| 6,172,642 | B1 * | 1/2001 | DiDomenico | ......... | H01Q 3/267 342/368 |
| 10,567,063 | B1 * | 2/2020 | Bakeer | ................. | H04B 7/0682 |

(Continued)

FOREIGN PATENT DOCUMENTS

| | | | | |
|---|---|---|---|---|
| CN | 110018446 A | * | 7/2019 | ............. G01R 25/04 |
| KR | 10-2006-0087606 | | 8/2006 | |
| KR | 10-1628183 | | 6/2016 | |

OTHER PUBLICATIONS

C. Will et al., "Error compensation of the temperature influence on radar based displacement measurements," 2017 IEEE Asia Pacific Microwave Conference (APMC), Kuala Lumpur, Malaysia, 2017, pp. 89-92, doi: 10.1109/APMC.2017.8251384. (Year: 2017).*
Wojaczek, P., Cristallini, D., O'Hagan, D. W., Colone, F., Blasone, G. P., & Lombardo, P. (2021). A Three-Stage Inter-Channel Calibration Approach for Passive Radar on Moving Platforms Exploiting the Minimum Variance Power Spectrum. Sensors, 21(1), 69. https://doi.org/10.3390/s21010069 (Year: 2021).*

(Continued)

*Primary Examiner* — Ladimir Magloire
*Assistant Examiner* — Remash R Guyah
(74) *Attorney, Agent, or Firm* — WOMBLE BOND DICKINSON (US) LLP

(57)                ABSTRACT

The disclosure relates to a radar control device and method. Specifically, a radar control device according to the disclosure comprises a transceiver transmitting a transmission signal through each transmission channel including a first transmission channel and a second transmission channel, receiving a reception signal of the transmission signal, reflected by a target, through each reception channel including a first reception channel and a second reception channel, and receiving temperature sensing information from a temperature sensor and a controller controlling to determine relative phase compensation information resultant from compensating a relative phase between the first reception channel and the second reception channel into a relative phase at a preset reference temperature, based on the reception signal and the temperature sensing information.

10 Claims, 6 Drawing Sheets

(51) Int. Cl.
    *H04B 7/04*         (2017.01)
    *H04W 72/20*      (2023.01)

(58) Field of Classification Search
    CPC .. G01S 7/41; G01S 7/4017; G01S 2013/0254;
                  H04W 72/20; H04B 17/12; H01P 1/181;
                           H01Q 3/267; H01Q 3/36
    USPC ............... 342/165, 173, 174, 368–377, 175,
                             342/82–103; 455/114.2
    See application file for complete search history.

(56)                   References Cited

U.S. PATENT DOCUMENTS

| | | | |
|---|---|---|---|
| 11,984,915 B2 * | 5/2024 | Hu | H04B 1/036 |
| 2002/0105463 A1 * | 8/2002 | Vail | H01Q 21/062 |
| | | | 342/372 |
| 2007/0052581 A1 * | 3/2007 | Shima | G01S 7/4021 |
| | | | 342/174 |
| 2012/0052825 A1 * | 3/2012 | Southcombe | H03F 3/245 |
| | | | 455/127.2 |
| 2017/0070247 A1 * | 3/2017 | Hageman | H04W 72/20 |
| 2019/0326859 A1 * | 10/2019 | Abbas Mohamed Helmy | |
| | | | H03F 1/565 |
| 2021/0344099 A1 * | 11/2021 | Madsen | H04B 7/06 |

OTHER PUBLICATIONS

Office Action dated Dec. 19, 2024 for Korean Patent Application No. 10-2022-0106801 and its English translation provided by Applicant's foreign counsel.

* cited by examiner

RADAR CONTROL DEVICE AND METHOD

CROSS-REFERENCE TO RELATED APPLICATION

This application claims priority from Korean Patent Application Nos. 10-2021-0118990, filed on Sep. 7, 2021 and 10-2022-0106801, filed on Aug. 25, 2022 which are hereby incorporated by reference for all purposes as if fully set forth herein.

BACKGROUND

Field

The present embodiments relate to a radar control device and method for compensating a relative phase.

Description of Related Art

Radar (RADAR) refers to a device that observes a target by means of radio waves. The transmitter/receiver of the radar may transmit a signal through the transmission antenna and receive the transmission signal reflected by an object, through the reception antenna. The radar may determine, e.g., the distance, speed, and angle of its nearby object using the transmitted/received signals.

In particular, vehicle radar needs to have a downsized and optimized performance as compared with radar in other fields. In relation thereto, recent vehicle radar devices are equipped with an array antenna to implement multi-transmission channels and reception channels. In this case, object detection may be performed in such a manner as to compare the respective phases of the reception channels based on the received signals for the same target.

Each component of the transmitter/receiver in the radar device may undergo changes in physical characteristics due to the ambient environment, such as temperature, and thus experience performance deterioration. As an example, the reception channel of the radar device may be changed in phase depending on the operation temperature, and the change in phase relative to temperature may differ per reception channel.

Given this, the difference in phase change relative to temperature between the reception channels may be an obstacle to, e.g., accurate detection of an object, such as for angle.

BRIEF SUMMARY

The disclosure provides a radar control device and method capable of preventing deterioration of object detection performance even in a harsh environment.

The disclosure also provides a radar control device and method capable of enhancing the accuracy of target detection by removing the effect of temperature in radar signal measurement.

In an aspect, the disclosure provides a radar control device comprising a transceiver transmitting a transmission signal through each transmission channel including a first transmission channel and a second transmission channel, receiving a reception signal of the transmission signal, reflected by a target, through each reception channel including a first reception channel and a second reception channel, and receiving temperature sensing information from a temperature sensor and a controller controlling to determine relative phase compensation information resultant from compensating a relative phase between the first reception channel and the second reception channel into a relative phase at a preset reference temperature, based on the reception signal and the temperature sensing information.

In another aspect, the disclosure provides a radar control method comprising a signal transmission/reception step transmitting a transmission signal through each transmission channel including a first transmission channel and a second transmission channel, receiving a reception signal of the transmission signal, reflected by a target, through each transmission channel including a first reception channel and a second reception channel, and receiving temperature sensing information from a temperature sensor, a temperature detection step detecting a temperature using the temperature sensing information, and a relative phase compensation step determining relative phase compensation information resultant from compensating a relative phase between the first reception channel and the second reception channel into a relative phase at a preset reference temperature, based on the reception signal and the temperature sensing information.

Effects of the Disclosure

According to the disclosure, there may be provided a radar control device and method capable of preventing deterioration of object detection performance even in a harsh environment.

According to the disclosure, there may be provided a radar control device and method capable of enhancing the accuracy of target detection by removing the effect of temperature in radar signal measurement.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
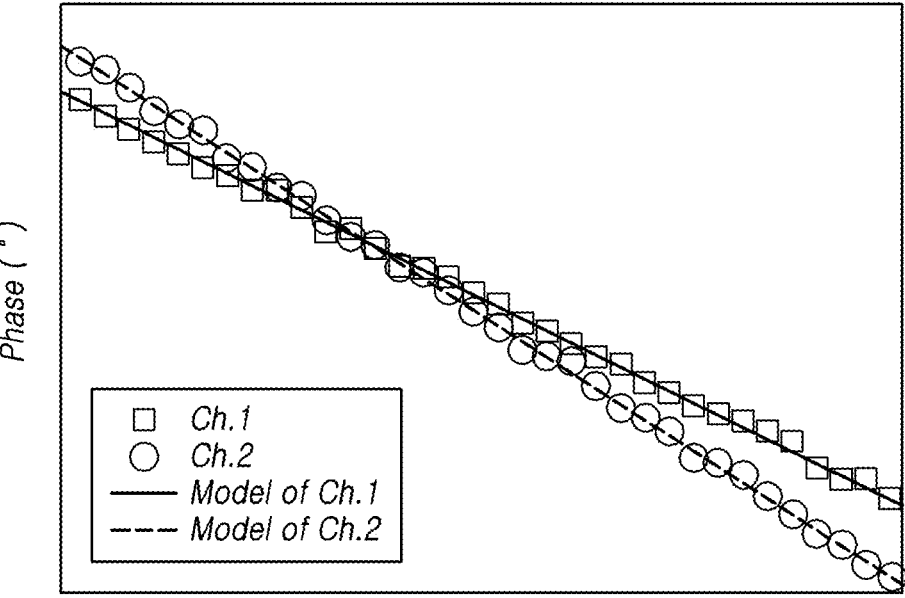
FIG. 1 is a graph illustrating that a phase of each reception channel is changed depending on temperature in a radar device.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A radar control device 10 is described below with reference to the accompanying drawings, according to an embodiment of the disclosure.

FIG. 1 is a graph illustrating that a phase of each transmission/reception channel is changed depending on temperature in a radar device.

For example, the radar device may include an antenna unit for transmitting and receiving radio signals. In this case, the antenna unit may include a plurality of transmission antennas and reception antennas and, in some cases, may be implemented in the form of an antenna array.

For example, the antenna unit may include a configuration in which several transmission channels and reception channels are implemented by a plurality of antennas. In this case, signal transmission/reception may be performed per transmission channel/reception channel.

Referring to FIG. 1, the phase of each transmission/reception channel in the radar device may vary depending on the temperature. A phase change rate depending on the temperature for each channel may have a predetermined value. The phase change rate depending on the temperature may differ per channel.

For example, the radar device may estimate the angle, distance, and speed of an object based on the phase of each channel. For example, in the radar device, the antennas may be arrayed so that each channel has a different phase, and after the phase difference between the channels is determined, the angle of a specific target may be estimated based on the inter-channel phase difference and the per-channel reception signals for the target. The inter-channel phase difference may also be referred to as an inter-channel relative phase.

In this case, if the antennas are arrayed to have steps therebetween in the horizontal direction, the azimuth angle of the target may be estimated based on the inter-channel phase difference and, if the antennas are arrayed have steps therebetween in the vertical direction, the elevation angle of the target may be estimated based on the inter-channel phase difference.

The performance of the radar device may be evaluated based on how accurately it is able to detect an object. If the radar device is implemented to have a higher angular resolution, the radar device may be evaluated as having further enhanced object detection accuracy.

A change in the temperature of the radar device may affect the signal transmission/reception of the radar device. For example, the phase of each antenna may be changed depending on the change in the temperature of the radar device.

If the radar control device 10 of the disclosure is used, compensation may be performed to remove the portion, which is changed depending on the temperature, of the phase difference of the reception channel. By detecting the target with the relative phase compensated in such a manner, it is possible to prevent deterioration of the radar device due to temperature and enhance the angular resolution in target detection.

As an example, the phase change rate according to the temperature change in the radar device may be estimated as a predetermined value. In this case, the phase change rate may be estimated by determining the slope of the straight line depicted to pass through the respective measurements of the reception signals in the graph showing the temperature-phase per reception signal.

The phase change rate may be separately estimated for each reception channel. For example, the phase change rate of each channel may be estimated by determining the slope of the straight line depicted to pass through the reception signal measurements of each channel.

As an example, as shown in FIG. 1, the radar device may have a first reception channel Ch. 1 and a second reception channel Ch. 2. The first reception channel Ch. 1 and the second reception channel Ch. 2 may differ in phase change rate according to temperature.

For example, the straight line passing through the reception signal measurements of the first reception channel Ch. 1 may be depicted based on a first reception channel model (Model of Ch. 1). In this case, the slope of the straight line depicted based on the first reception channel model (Model of Ch. 1) may be estimated as the phase change rate according to the temperature of the first reception channel Ch. 1.

The phase change rate according to the temperature of the reception signals of the second reception channel Ch. 2 may also be estimated in the same manner as the method applied to the first reception channel Ch. 1. In other words, the slope of the straight line depicted to pass through the reception signal measurements according to a second reception channel model (Model of Ch. 2) may be estimated as the phase change rate according to the temperature of the second reception channel Ch. 2.

The slope of the straight line depicted based on the first reception channel model (Model of Ch. 1) may differ from the slope of the straight line depicted to pass through the reception signal measurements according to the second reception channel model (Model of Ch. 2). As such, the phase change rate depending on the temperature may differ per reception channel.

In sum, although the antennas are manufactured to have the same specifications, the slope of phase by temperature may differ per channel as shown in FIG. 1, since it is hard to implement the antennas to have exactly the same specifications.

Thus, if the phase by the temperature change is not properly known, the performance of radar may be deteriorated, decreasing reliability.

An embodiment of performing compensation to remove the effect of a temperature change in the phase of the reception signal using a radar control device according to the disclosure is described below.

Figure 2:
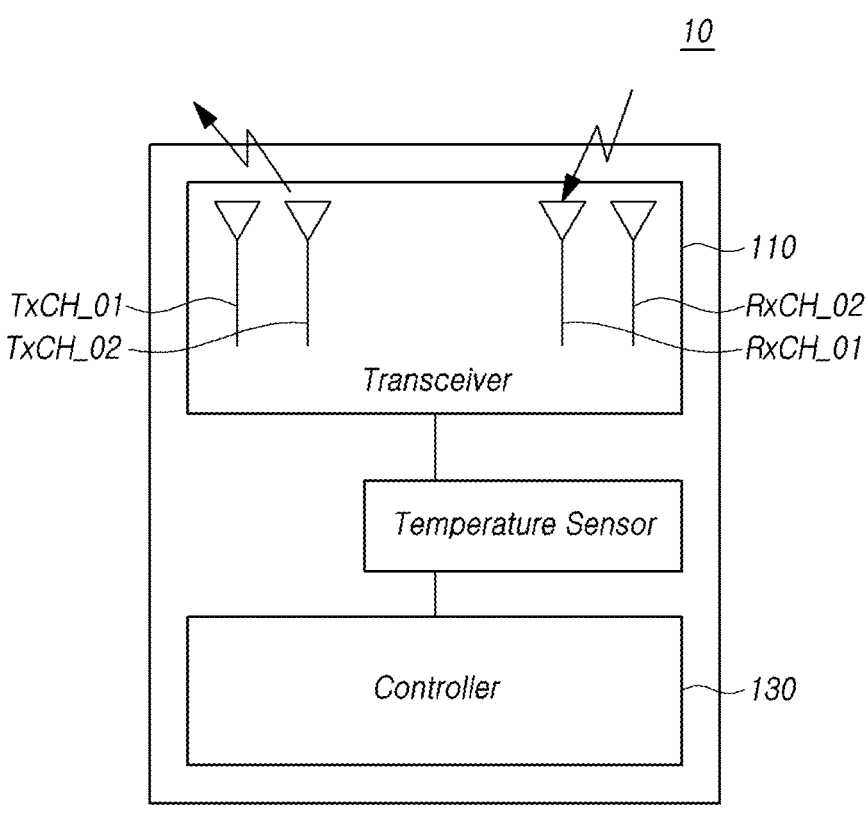
FIG. 2 is a block diagram illustrating a radar control device according to an embodiment.

FIG. 2 is a block diagram illustrating a radar control device according to an embodiment.

Referring to FIG. 2, a radar control device 10 according to an embodiment may include a transceiver 110 and a controller 130.

For example, the radar control device 10 may include a transceiver 110 transmitting a transmission signal through each transmission channel including a first transmission channel and a second transmission channel, receiving a reception signal reflected by a target through each reception channel including a first reception channel and a second reception channel, and receiving temperature sensing information from a temperature sensor and a controller 130 determining relative phase compensation information resultant from compensating a relative phase between the first reception channel and the second reception channel at each sensed temperature into a relative phase at a preset reference temperature, based on the reception signal and the temperature sensing information.

According to an embodiment, the radar control device 10 may include a configuration to control a radar device included in an advanced driver assistance system (ADAS) that is equipped in a host vehicle to provide information helpful for driving the host vehicle or assist the driver in driving the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

The host vehicle may refer to a vehicle that is equipped with a prime mover to roll the wheels by the power therefrom to move on the ground without a pre-built railway or track. Further, the host vehicle may be an electric vehicle that is an electricity-powered vehicle that obtains driving energy by rotating a motor with electricity from a battery rather than obtaining driving energy from combustion of a fossil fuel.

As an example, the radar control device 10 is applicable both where the host vehicle is a manned vehicle and where the host vehicle 11 is an autonomous vehicle. In this case, the radar device may transmit/receive signals, and the radar control device 10 may determine preset information using the transmitted/received signals or control detection of the target using the determined information.

The antenna unit of the radar device may include one or more transmission antennas and one or more reception antennas. Each transmission/reception antenna may be an array antenna having one or more radiation elements connected in series by a feed line, but is not limited thereto.

In some cases, the antenna unit may include a plurality of transmission antennas and a plurality of reception antennas. Various antenna array structures may be obtained depending on the order or interval in which the antennas are arrayed.

In an embodiment, if each antenna unit includes one transmission antenna and one reception antenna, the transmission antenna may include a first transmission channel and a second transmission channel, and the reception antenna may include a first reception channel and a second reception channel.

In another embodiment, if each antenna unit includes a plurality of transmission antennas and reception antennas, the first transmission antenna and the second transmission antenna may include a first transmission channel and a second transmission channel, respectively, and the first reception antenna and the second reception antenna may include a first reception channel and a second reception channel, respectively.

The transceiver 110 may transmit signals through the transmission channel and receive signals through the reception channel. For example, if the transceiver 110 includes two transmission channels and two reception channels, the transceiver 110 may transmit signals through the first transmission channel and the second transmission channel and receive the reflected signals through the first reception channel and the second reception channel. As another example, the transceiver 110 may transmit a transmission signal through each transmission channel including the first transmission channel and the second transmission channel. Also, the transceiver 110 may receive a reception signal in which the transmission signal is reflected by the target through each reception channel including the first reception channel and the second reception channel.

The transceiver 110 may transmit signals in such a manner as to switch the plurality of transmission antennas one by one. In this case, the transceiver 110 may transmit the transmission signal through the switched transmission antenna or may transmit signals through multiple transmission channels assigned to the plurality of transmission antennas.

The transceiver 110 may include an oscillation unit that generates transmission signals for one transmission channel allocated to the switched transmission antenna or multiple transmission channels allocated to the plurality of transmission antennas. The oscillator may include, e.g., a voltage-controlled oscillator (VCO) and an oscillator.

The transceiver 110 may receive the transmission signal reflected by the object, through the reception antenna.

The transceiver 110 may receive the signal in such a manner as to switch the plurality of reception antennas one by one. In this case, the transceiver 110 may receive the transmission signal reflected by the target, through the switched reception antenna or may receive it through multiple reception channels assigned to the plurality of reception antennas.

The transceiver 110 may include, e.g., a low noise amplifier (LNA) that low-noise amplifies the reception signal, which is received through one reception channel allocated to the switched reception antenna or through multiple reception channels allocated to the plurality of reception antennas, a mixer that mixes the low-noise amplified reception signal, an amplifier that amplifies the mixed reception signal, and an analog-digital converter (ADC) that converts the amplified reception signal into a digital signal to thereby generate reception data.

For example, the transceiver 110 may receive temperature sensing information from the temperature sensor. In this case, the temperature sensor may detect the operation temperature of the radar device. For example, the temperature sensor may be installed inside or outside the radar device to enable detection of the operation temperature of the transceiver 110. In some cases, the temperature sensor may be installed to detect the operation temperature for each antenna included in the transceiver 110 or each transmission/reception channel and, based on the sensed temperature, the control unit 130 may compensate the absolute phase and the relative phase.

As a specific example, if the temperature detected at the first reception channel and the second reception channel is x, the controller 130 may compensate the absolute phases, at the sensed temperature x, of the first reception channel and the second reception channel, into absolute phases at a reference temperature $x_0$ and, based thereupon, compensate the relative phase, at the sensed temperature x, between the first reception channel and the second reception channel into a relative phase at the reference temperature $x_0$.

As another example, if the temperature detected at the first reception channel is $x_1$, and the temperature detected at the second reception channel is $x_2$, the controller 130 may compensate the absolute phase, at the sensed temperature $x_1$, of the first reception channel into an absolute phase at the reference temperature $x_0$, and compensate the absolute phase, at the sensed temperature $x_2$, of the second reception channel into an absolute phase at the reference temperature $x_0$ and, based thereupon, compensate the relative phase between the first reception channel at the sensed temperature $x_1$ and the second reception channel at the sensed temperature $x_2$ into a relative phase at the reference temperature $x_0$.

For example, the transceiver 110 may receive temperature sensing information from the temperature sensor, every predetermined period.

The controller 130 may compensate the absolute phases and the relative phase of the first reception channel and the second reception channel based on the temperature sensing information.

For example, the controller 130 may determine the absolute phases of the first reception channel and the second reception channel based on the reception signal and, based on the determined absolute phases and temperature sensing information, determine information according to the absolute phase according to the temperature of each reception channel. In this case, the pieces of absolute phase information by temperature (temperature, phase) may be represented in the form of an ordered pair.

The controller 130 may determine the relative phase between the first reception channel and the second reception channel based on (temperature, phase) information about each of the first reception channel and the second reception channel. In this case, the relative phase may be determined as a phase difference between the absolute phase of the first reception channel and the absolute phase of the second reception channel.

The controller 130 may compensate the absolute phase of each of the first reception channel and the second reception channel into an absolute phase according to the reference temperature, based on the (temperature, phase) information about each reception channel and the preset reference temperature and, based thereupon, compensate the relative phase between the first reception channel and the second reception channel into the relative phase according to the reference temperature.

This is described below with reference to equations.

The temperature-phase relation expression shown in FIG. 1 may be represented as a linear equation, as in Equation 1 below.

$$y:=f(x)=a \cdot x+b \qquad \text{[Equation 1]}$$

Here, y denotes the phase, x the temperature, a the slope in the temperature-phase graph, and b the y-intercept in the temperature-phase graph.

Referring to Equation 1, if at least two or more values (e.g., temperature x and phase y) are known for any reception channel, a and b may be determined thereby. The absolute phase according to each temperature x for the corresponding reception channel may be determined by using a and b determined. In this case, one of the (temperature x, phase y) values may be the (temperature $x_0$, phase $y_0$) value at the preset reference temperature $x_0$.

The controller 130 may determine the first absolute phase of the first reception channel and the second absolute phase of the second reception channel. Based on the first absolute phase and the second absolute phase, the controller 130 may determine the relative phase between the first reception channel and the second reception channel.

As an example, the controller 130 may determine a temperature variation and absolute phase variation based on two or more pieces of (temperature, phase) information for the first reception channel and, based thereupon, determine the phase change rate according to the temperature change of the first reception channel. The controller 130 may determine the phase change rate according to the temperature change of the first reception channel, as a first slope.

In substantially the same manner, the controller 130 may determine a second slope that represents the phase change rate according to the temperature change of the second reception channel, based on two or more pieces of (temperature, phase) information about the second reception channel.

As another example, the temperature-phase relation for each reception channel may be represented in the form of an equation, e.g., Equation 1, or may also be represented in the form of a matrix. In this case, in (temperature, phase), the temperature and the absolute phase may be denoted by x and y, respectively, and be represented as a matrix as shown in Equation 2.

In this case, the first slope may be determined as the product of the pseudo-inverse matrix of the temperature matrix extracted from the temperature variation and the first phase matrix extracted from the phase of the first reception channel, and the second slope may be determined as the product of the pseudo inverse matrix of the temperature matrix extracted from the temperature variation and the second phase matrix extracted from the phase of the second reception channel.

Equation 2 below represents the temperature-phase relation expression in a matrix form when temperature-phase measurement is performed N times for any reception channel.

$$\begin{bmatrix} x_1 & 1 \\ x_2 & 1 \\ \vdots & \vdots \\ x_N & 1 \end{bmatrix} \begin{bmatrix} a \\ b \end{bmatrix} = \begin{bmatrix} y_1 \\ y_2 \\ \vdots \\ y_N \end{bmatrix} \qquad \text{[Equation 2]}$$

Here, $x_i$ (where i=1, 2, . . . , N) denotes the i-th measured temperature, $y_i$ (where i=1, 2, . . . , N) denotes the i-th measured absolute phase, a denotes the slope in the temperature-phase graph, and b denotes the y-intercept in the temperature phase graph.

$$P \cdot Q = R \qquad \text{[Equation 3]}$$

Equation 2 may be represented in a form simplified Equation 3. In this case, in Equation 2, the first matrix regarding $x_1$, the second matrix regarding a and b, and the third matrix regarding yi may be represented in simplified forms corresponding to P, Q, and Q, respectively.

Referring to Equations 2 and 3, since the matrix P is not a square matrix unless N is 2, it is difficult to determine the inverse matrix of P in a general method.

However, if a mathematical method, such as minimum mean square error (MMSE), is used, a matrix approximate to the inverse matrix may be determined even when P is not a square matrix.

For example, as shown in Equation 4 below, an approximate value Q may be determined by using the matrix product between the pseudo inverse matrix of P and R.

$$Q = P^+R, \quad P^+ = (P^TP)^{-1}P^T \qquad \text{[Equation 4]}$$

Referring to Equation 4, the pseudo inverse matrix of P is the same as the matrix product of the transpose matrix of P and the inverse matrix of the matrix product of the transpose matrix of P and P. A series of computational processes, such as matrix multiplication, matrix transposition, and inverse matrix, may have limitations in implementation in terms of computation time and space, power consumption, and the like, and may cause relatively significant resource consumption. Given this, equations 2 to 4 may be reorganized into Equations 5 and 6 below.

$$
\begin{bmatrix} a \\ b \end{bmatrix} = \left( \begin{bmatrix} x_1 & x_2 & \dots & x_N \\ 1 & 1 & \dots & 1 \end{bmatrix} \begin{bmatrix} x_1 & 1 \\ x_2 & 1 \\ \vdots & \vdots \\ x_N & 1 \end{bmatrix} \right)^{-1}
$$

$$
\begin{bmatrix} x_1 & x_2 & \dots & x_N \\ 1 & 1 & \dots & 1 \end{bmatrix} \begin{bmatrix} y_1 \\ y_2 \\ \vdots \\ y_N \end{bmatrix}
$$

$$
= \frac{1}{N \cdot \left( \sum_{i=1}^{N} x_i^2 \right) - \left( \sum_{i=1}^{N} x_i \right)^2}
$$

$$
\begin{bmatrix} N \cdot \left( \sum_{i=1}^{N} x_i y_i \right) - \sum_{i=1}^{N} y_i \\ \left( \sum_{i=1}^{N} x_i^2 \right) \cdot \left( \sum_{i=1}^{N} y_i \right) - \left( \sum_i x_i \right) \cdot \left( \sum_{i=1}^{N} x_i y_i \right) \end{bmatrix}
$$

[Equation 5]

$$
a = \frac{N \cdot \left( \sum_{i=1}^{N} x_i y_i \right) - \left( \sum_{i=1}^{N} x_i \right)\left( \sum_{i=1}^{N} y_i \right)}{N \cdot \left( \sum_{i=1}^{N} x_i^2 \right) - \left( \sum_{i=1}^{N} x_i \right)^2}
$$

[Equation 6]

Referring to Equations 5 and 6, by using Equation 6 reorganized from Equation 5, the slope a may be determined only by 2N+4 multiplications and 5N−3 additions.

In sum, since the slope a may be determined only by a number of computations corresponding to the O(N) level in Big-Oh notation, it is possible to determine the phase change rate according to the temperature change for each reception channel with relatively high computation efficiency. The number of computations may be the number of computations of each scalar value.

For example, the controller 130 may determine the first slope and the second slope regarding the phase change rate according to the temperature change for each of the first reception channel and second reception channel, based on a preset slope determination equation. The controller 130 may determine relative phase compensation information between the first reception channel and the second reception channel based on the first slope and the second slope.

As an example, the controller 130 may extract (temperature, phase) ordered pair information regarding the absolute phase at the temperature x of each reception channel, based on the reception signal and temperature sensing information. The slope determination equation may be set to determine the temperature matrix and phase matrix based on each piece of (temperature, phase) ordered pair information and determine the slope based on the product of the pseudo-inverse matrix of the temperature matrix and the phase matrix. In some cases, (temperature, phase) ordered pair information, based on the temperature sensing information and the reception signal, at least two or more may be extracted for each reception channel.

In sum, the temperature-phase relation expression for each reception channel and the slope a and the y-intercept b included in the temperature-phase relation expression may be determined using two or more (temperature, phase) values for each reception channel and Equations 1 to 6.

In this case, to determine the slope a and y-intercept b together among the components of the temperature-phase relation expression, a preset slope and y-intercept determination equation may be used and, to determine the slope a, a preset slope determination equation may be used.

As an example, if Equation 5 is set as the slope and y-intercept determination equation, the slope a and y-intercept may be determined in the temperature-phase relation expression of each reception channel by applying the (temperature, phase) measurements for the reception channel to Equation 5.

As a specific example, if Equation 5 is set as the slope and y-intercept determination equation for the first reception channel and the second reception channel, and two or more (temperature, phase) values are applied to Equation 5, slope $a_1$ and y-intercept $b_1$ in the temperature-phase relation expression of the first reception channel and slope $a_2$ and y-intercept $b_2$ in the temperature-phase relation expression of the second reception channel may be determined.

As another example, if Equation 6 is set as the slope determination equation, the slope a in the temperature-phase relation expression of each reception channel may be determined by applying the (temperature, phase) measurements for the reception channel to Equation 6.

As a specific example, if Equation 6 is set as the slope determination equation for the first reception channel and the second reception channel, and two or more (temperature, phase) values are applied to Equation 6, slope $a_1$ in the temperature-phase relation expression of the first reception channel and slope $a_2$ in the temperature-phase relation expression of the second reception channel may be determined.

It is not necessary to use only Equations 5 and 6 to determine the slope and y-intercept. For example, other methods than the method of using Equation 5 and Equation 6 may be used to determine the slope and the y-intercept, as follows: a temperature difference and absolute phase difference between the pieces of (temperature, phase) information are determined based on at least two or more pieces of (temperature, phase) information, the slope is determined based on the magnitude of the absolute phase difference relative to the magnitude of the temperature difference, then an equation for the y-intercept is obtained by applying the (temperature, phase) information and determined slope to the temperature-phase relation expression, and the y-intercept is determined by the obtained equation.

After the temperature-phase relation expression f(x) =a·x+b and slope a are determined, the absolute phase for each reception channel may be determined using the temperature sensing information, temperature-phase relation expression, and slope a for each reception channel.

For example, if there are (temperature, phase) measurements for the first reception channel and the second reception channel, a first temperature-phase relation expression and slope $a_1$ for the first reception channel and a second temperature-phase relation expression and slope $a_2$ for the second reception channel may be determined.

Then, the first absolute phase of the first reception channel may be determined at any temperature x by using the first temperature-phase relation expression and $a_1$. The second absolute phase of the second reception channel may be determined at any temperature x by using the second temperature-phase relation expression and $a_2$.

As is described below with reference to Equations 8 to 10, the absolute phase at the sensed temperature may be compensated into the absolute phase at the reference temperature. In this case, if the relative phase $\Delta f(x)$ between the first reception channel and the second reception channel is known at the temperature x, the compensated relative phase between the first reception channel and the second reception channel at the reference temperature $x_0$ may be determined using slopes $a_1$ and $a_2$ although all the temperature-phase relation expressions are not used.

In sum, the radar control device 10 according to an embodiment may remove the portion influenced by the temperature in determining the absolute phase of each reception channel by compensating the absolute phases and relative phase and thereby maintain the homeostasis of the absolute phase.

The relative phase between the first reception channel and the second reception channel at the temperature x detected through reception of the temperature sensing information may be represented as Equation 7 below.

$$\Delta f(x):=f_1(x)-f_2(x),$$

$$f_1(x):=a_1 \cdot x+b_1 \qquad \text{[Equation 7]}$$

Equation 8 below represents the relative phase between the first reception channel and the second reception channel at a preset reference temperature $x_0$. The relative phase may be determined as the phase difference between the first reception channel and the second reception channel.

In this case, the reference temperature $x_0$ may be an arbitrarily preset temperature value. Alternatively, the same temperature detected for a predetermined time or longer based on the temperature sensing information received through the temperature sensor may be set as the reference temperature. Alternatively, the temperature detected at the highest frequency for a predetermined time may be set as the reference temperature.

$$\Delta f(x_0) = f_1(x_0) - f_2(x_0) \qquad \text{[Equation 8]}$$
$$= (a_1 \cdot x_0 + b_1)(a_2 \cdot x_0 + b_2)$$
$$= x_0 \cdot (a_1 - a_2) + (b_1 - b_2)$$

Here, $a_2$ may mean the first slope in the first temperature-phase relation expression for the first reception channel, and $a_2$ may mean the second slope in the second temperature-phase relational expression for the second reception channel.

As an example, the controller 130 may determine the relative phase compensation information between the first reception channel and the second reception channel based on a preset relative phase compensation equation. The relative phase compensation equation may be set to determine the relative phase control information, as the sum of the relative phase between the first reception channel and the second reception channel and compensation weight information determined by multiplying the first slope minus the second slope by the reference temperature minus the temperature x.

For example, the absolute phase at the temperature x detected through the temperature sensing information received from the temperature sensor may be compensated into the absolute phase at the reference temperature using Equation 9 below.

$$g_i(x)=f_i(x)+a_i(x_0-x) \qquad \text{[Equation 9]}$$

Referring to FIG. 9, the compensated absolute phase $g_i(x)$ of the i-th reception channel may be determined by adding the value determined by multiplying the temperature difference $(x_0-x)$ between the reference temperature $x_0$ and the sensed temperature x by the slope $a_i$ in the temperature-phase graph of the i-th reception channel, to the absolute phase $f_i(x)$ of the sensed temperature x.

As an example, the controller 130 may compensate the first absolute phase of the first reception channel at the sensed temperature x into the third absolute phase at the temperature $x_0$, using Equation 9, reference temperature $x_0$, and the first slope $a_1$.

As another example, the controller 130 may compensate the second absolute phase of the second reception channel at the sensed temperature x into the fourth absolute phase at the temperature $x_0$, using Equation 9, reference temperature $x_0$, and the second slope $a_2$.

Then, the controller 130 may compensate the relative phase between the first reception channel and the second reception channel at the sensed temperature x into the relative phase at the reference temperature $x_0$, based on the third absolute phase and the fourth absolute phase as described in connection with Equation 10.

As an example, the controller 130 may compensate the relative phase between the first reception channel and the second reception channel, corresponding to the temperature detected at the transceiver 110, into the relative phase at the reference temperature $x_0$, based on the difference between the third absolute phase and the fourth absolute phase by applying Equation 10 below.

In the radar device, a phase difference between reception channels may be used for target detection. For example, the radar device having the first reception channel and the second reception channel may perform, e.g., estimation of the angle of the target through the process of comparing the reception signal of the first reception channel and the reception signal of the second reception channel, reflected by the same target and received, based on the phase difference between the first reception channel and the second reception channel.

$$\Delta g(x) := g_1(x) - g_2(x) \qquad \text{[Equation 10]}$$
$$= f_1(x) + a_1 \cdot (x_0 - x)) - (f_2(x) + a_2 \cdot (x_0 - x))$$
$$= (a_1 \cdot x + b_1 + a_1(x_0 - x)) - (a_2 \cdot x + b_2 + a_2 \cdot (x_0 - x))$$

-continued $$= (a_1 - a_2) \cdot x + (b_1 - b_2) + (a_1 - a_2) \cdot (x_0 - x)$$

$$= \Delta f(x) + (a_1 - a_2) \cdot (x_0 - x)$$

Referring to Equation 10, $\Delta g(x)$ determined by compensating the relative phase between the first reception channel and the second reception channel with respect to $x_0$ may be determined using $g_1(x)$ determined by compensating the absolute phase of the first reception channel at the sensed temperature x with respect to the reference temperature $x_0$, and $g_2(x)$ determined by compensating the absolute phase of the second reception channel at the temperature x with respect to the reference temperature $x_0$.

Specifically, the compensated relative phase $\Delta g(x)$ may be represented as the phase difference between the compensated absolute phase $g_1(x)$ of the first reception channel and the compensated absolute phase $g_2(x)$ of the second receiving channel. With reference to Equation 9, $\Delta g(x)$ may be summarized into a value determined by subtracting the product of the difference between the slopes $a_1$ and $a_2$ and the difference $(x_0-x)$ between the temperatures $x_0$ and x from the relative phase $\Delta f(x)$ between the first reception channel and the second reception channel at the sensed temperature x.

According to the foregoing, it is possible to determine the slope $a_1$ of the first temperature-phase relation expression of the first reception channel, the slope $a_2$ of the second temperature-phase relation expression of the second reception channel, and the relative phase $\Delta f(x)$ between the first reception channel and the second reception channel at the temperature x, through the process of applying the (temperature, phase) values of each reception channel to Equation 1 to Equation 8.

Then, it is possible to determine the compensated relative phase $\Delta g(x)$ between the first reception channel and the second reception channel with respect to the preset reference temperature $x_0$ by applying $a_1$, $a_2$, and $\Delta f(x)$ to Equation 10.

The relative phase before compensation by the radar device, i.e., the portion represented as $\Delta f(x)$ in Equations 7 to 10, may be determined only by obtaining a signal or data through the transceiver 110 without a separate determination process, in some cases.

In such a case, the relative phase between the reception channels at the sensed temperature in the above-described relative phase compensating process may be determined as the relative phase between the reception channels immediately without passing through the process of measuring the absolute phases of the reception channels and determining the difference between the measured absolute phases.

For example, the transceiver 110 may receive the reception signal at the first reception channel and the reception signal at the second reception channel, for the same target at the same time. Then, the phase difference between the first reception channel and the second reception channel may be determined based on the phase difference between the reception signal of the first reception channel and the reception signal of the second reception channel and be determined as the relative phase between the first reception channel and the second reception channel at the sensed temperature.

In such a case, the relative phase between the reception channels at the sensed temperature may be determined without determining the y-intercept part in the temperature-phase relation expression of each reception channel. For example, determining the relative phase between the first reception channel and the second reception channel at the sensed temperature x eliminates the need for separately determining $b_1$ and $b_2$ which are y-intercepts in the respective temperature-phase relation expressions of the first reception channel and the second reception channel.

As a result, if information regarding the relative phase at the sensed temperature may be determined without separately determining the absolute phase and the y-intercept in the temperature-phase relation expression for each reception channel, the compensated relative phase at the reference temperature $x_0$ may be determined more quickly and simply using Equation 9 and Equation 10. Accordingly, it is possible to enhance computation efficiency in relative phase compensation for removing the effect of a temperature change.

In the radar device, as the per-reception channel phases at the temperature x, the absolute phases and the relative phase all may be given but, in some cases, only the relative phase between the reception channels may be given.

As an example, even when the relative phase $\Delta f(x)$ between the reception channels at the temperature x is given, but the respective absolute phases $f_1(x)$ and $f_2(x)$ of the reception channels are not given, if the slopes $a_1$ and $a_2$ for each reception channel are known, the relative phase between the reception channels may be determined using Equation 10.

In sum, it is possible to determine the relative phase control information between the first reception channel and the second reception channel at the reference temperature $x_0$ by using the relative phase between the first reception channel and the second reception channel at the temperature x, the first slope and second slope, and Equation 10.

For example, if Equation 10 is set as the relative phase compensation equation, the relative phase control information between the first reception channel and the second reception channel at the reference temperature $x_0$ may be determined by applying the relative phase between the first reception channel and the second reception channel at the temperature x, and the first slope and second slope to Equation 10.

The controller 130 may determine the relative phase control information between the first reception channel and the second reception channel based on the first absolute phase of the first reception channel and the second absolute phase of the second reception channel.

For example, the controller 130 may determine the absolute phase of the first reception channel as the first absolute phase and the absolute phase of the second reception channel as the second absolute phase and determine the phase difference between the first absolute phase and the second absolute phase as the relative phase between the first reception channel and the second reception channel.

Next, the controller 130 may determine the third absolute phase regarding the absolute phase of the first reception channel at the temperature $x_0$ based on the difference between the reference temperature $x_0$ and the temperature x detected through the temperature sensing information and determine the fourth absolute phase regarding the absolute phase of the second reception channel at the temperature $x_0$ based on the difference between the reference temperature $x_0$ and the temperature x detected through the temperature sensing information.

Then, the controller 130 may determine the relative phase control information between the first reception channel and the second reception channel based on the difference between the third absolute phase and the fourth absolute phase. As a specific example, the phase difference between the third absolute phase and the fourth absolute phase may be determined as the relative phase control information.

Figure 3:
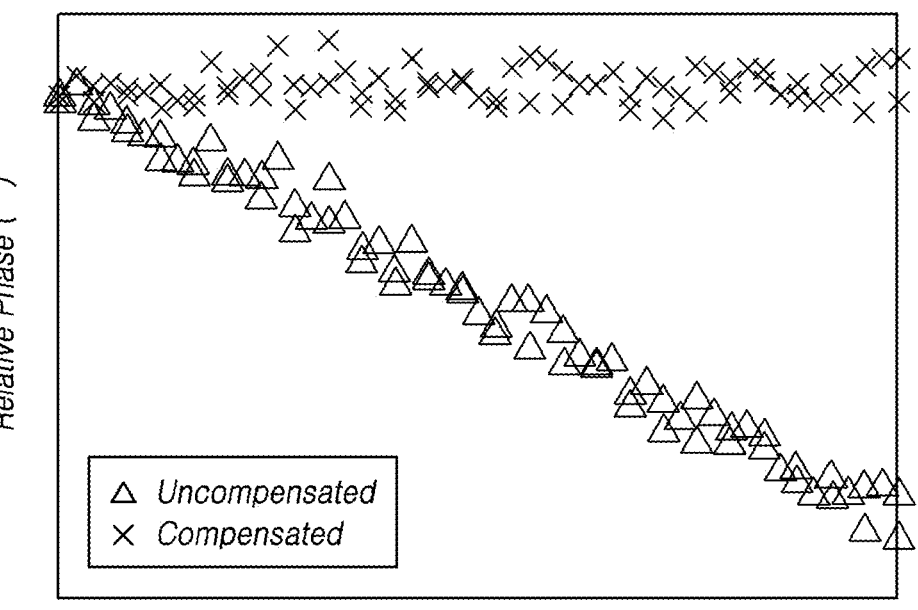
FIG. 3 is a graph illustrating phase compensation in a radar control device according to an embodiment.

FIG. 3 is a graph illustrating phase compensation in a radar control device according to an embodiment.

Referring to FIG. 3, it may be identified that the relative phase compensated using the radar control device 10 has reduced variations at different temperatures but exhibits a constant value.

In contrast, it may be identified that the uncompensated relative phase is changed as the temperature varies.

As described above, the radar control device 10 according to an embodiment of the disclosure may determine a phase independent of temperature changes by compensating the absolute phase at the sensed temperature into the absolute phase at the reference temperature.

The radar control device 10 may be implemented as, e.g., an electronic control unit (ECU).

According to an embodiment, a computer system (not shown), such as the radar control device 10, may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a radar control method using the radar control device 10 capable of performing the above-described embodiments of the disclosure.

Figure 4:
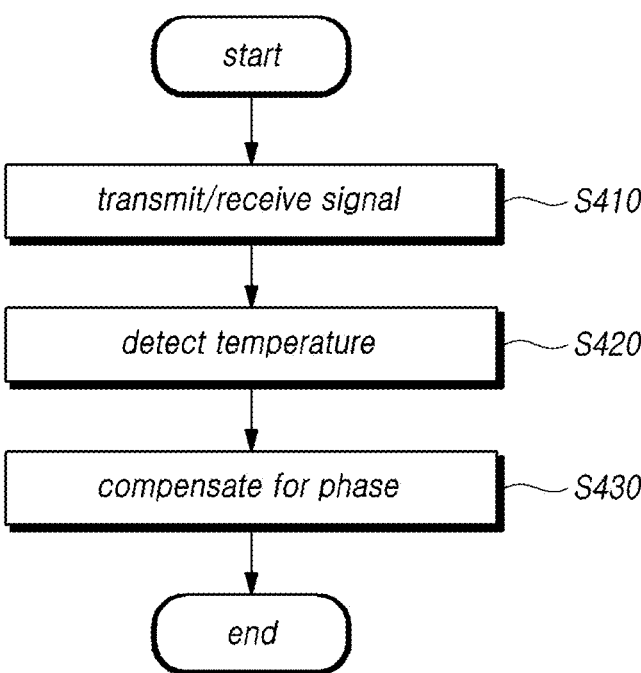
FIG. 4 is a flowchart illustrating a radar control method according to an embodiment.

FIG. 4 is a flowchart illustrating a radar control method according to an embodiment.

Referring to FIG. 4, a radar control method according to the disclosure may include a signal transmission/reception step S410 transmitting a transmission signal through a first transmission channel and a second transmission channel, receiving a reception signal reflected by a target through a first reception channel and a second reception channel and receiving temperature sensing information from a temperature sensor, a temperature detection step S420 detecting a temperature using the temperature sensing information, and a relative phase compensation step S430 determining relative phase compensation information resultant from compensating a relative phase between the first reception channel and the second reception channel into a relative phase at a preset reference temperature.

Figure 5:
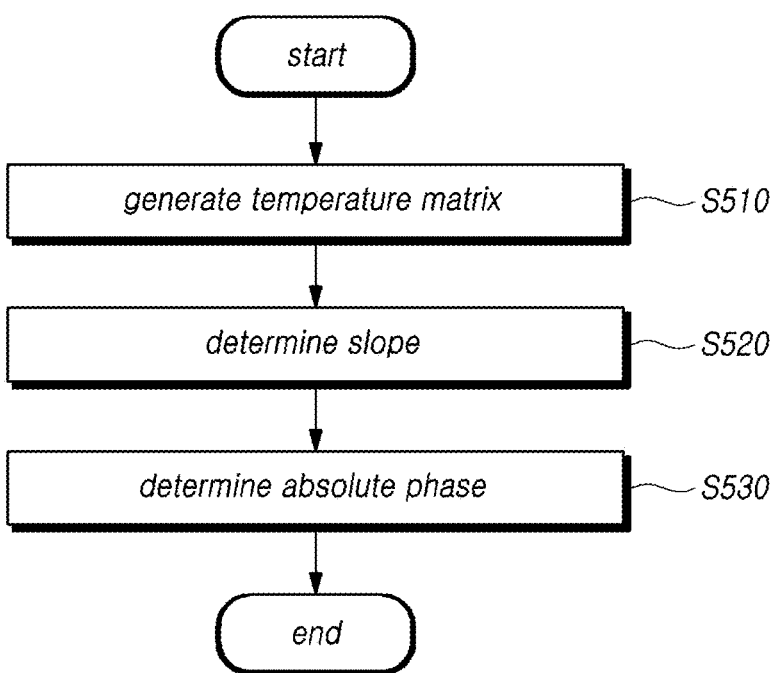
FIG. 5 is a flowchart illustrating an example of determining an absolute phase of each reception channel in a radar control method according to an embodiment.

FIG. 5 is a flowchart illustrating an example of determining an absolute phase of each reception channel in a radar control method according to an embodiment.

Referring to FIG. 5, the radar control device 10 may generate a matrix for the reference temperature (S510).

The relative phase compensation step S430 may determine a first absolute phase of a first reception channel corresponding to a temperature x detected through temperature sensing information based on a first slope and a second absolute phase of a second reception channel corresponding to the temperature x detected through the temperature sensing information based on a second slope.

Since the first channel including the first transmission channel and the first reception channel and the second channel including the second transmission channel and the second reception channel have different physical characteristics, the radar control device may determine the first absolute phase and the second absolute phase for each thereof.

The radar control device 10 may determine the temperature change slope for the reference temperature (S520).

According to Equations 1 to 6 described above, the first slope may be determined by determining the temperature matrix and first phase matrix from the (temperature, phase) values and multiplying the pseudo inverse matrix of the temperature matrix by the first phase matrix, and the second slope may be determined by determining the temperature matrix and second phase matrix from the (temperature, phase) values and multiplying the pseudo inverse matrix of the temperature matrix by the second phase matrix.

The radar control device 10 may determine the absolute phase for the reference temperature (S530). For example, the first absolute phase of the first reception channel for the reference temperature $x_0$ may be determined by extracting the slope $a_1$ and y-intercept $b_1$ from the product of the pseudo inverse matrix of the temperature matrix and the first phase matrix and using the temperature-phase relation expression $f_1(x_0)=a_1 \cdot x_0 + b_1$ of the first reception channel implemented thereby. The second absolute phase of the second reception channel for the reference temperature $x_0$ may also be determined in the same manner.

According to Equation 6 described above, the slope a may be determined, and the absolute phase y may be determined by applying it.

Figure 6:
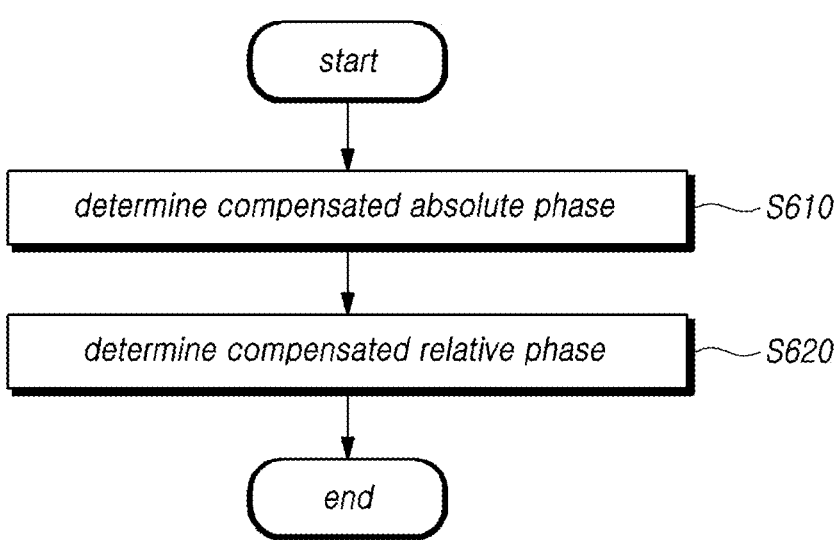
FIG. 6 is a flowchart illustrating relative phase compensation in a radar control method according to an embodiment.

FIG. 6 is a flowchart illustrating relative phase compensation in a radar control method according to an embodiment.

Referring to FIG. 6, the radar control device 10 may determine the compensated absolute phase for the reference temperature $x_0$ based on the absolute phase determined for the sensed temperature x.

To prevent the phase from changing according to the temperature change, the radar control device 10 may compensate the absolute phase at the sensed temperature x into the absolute phase at the reference temperature $x_0$.

To that end, the relative phase compensation step S430 may compensate into the third absolute phase and fourth absolute phase based on the first absolute phase of the first reception channel at the temperature x and the second absolute phase of the second reception channel. The relative phase compensation step S430 may determine the relative phase compensation information with respect to the reference temperature $x_0$, between the first reception channel and the second reception channel, based on the third absolute phase and the fourth absolute phase.

Specifically, the third absolute phase of the first reception channel may be determined based on the difference between the reference temperature $x_0$ and the temperature x detected through the temperature sensing information, and the fourth absolute phase of the second reception channel may be determined based on the difference between the reference temperature $x_0$ and the temperature x detected through the temperature sensing information.

The radar control device 10 may determine the compensated relative phase. Specifically, the relative phase compensation step S430 may compensate the relative phase between the first reception channel and the second reception channel at the temperature detected through the temperature sensing information into the relative phase compensation information regarding the relative phase at the reference temperature $x_0$, based on the difference between the third absolute phase and the fourth absolute phase.

As described above, according to the disclosure, there may be provided a radar control device and method capable of preventing deterioration of object detection performance even in a harsh environment.

According to the disclosure, there may be provided a radar control device and method capable of enhancing the accuracy of target detection by removing the effect of temperature in radar signal measurement.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A radar control device, comprising:
a temperature sensor for detecting a temperature of the radar control device;
a transceiver transmitting a transmission signal through each transmission channel including a first transmission channel and a second transmission channel, receiving a reception signal of the transmission signal, reflected by a target, through each reception channel including a first reception channel and a second reception channel, and receiving temperature detection information from the temperature sensor; and
a controller, which is implemented as an electronic control unit (ECU), configured to be controlled to determine relative phase compensation information between the first reception channel and the second reception channel, which is a relative phase between the first reception channel and the second reception channel at a reference temperature,
wherein the controller determines a first slope and a second slope regarding a phase variation according to a temperature change in each of the first reception channel and the second reception channel, based on a slope determination equation,
wherein the controller determines the relative phase compensation information between the first reception channel and the second reception channel based on a relative phase compensation equation, the first slope, and the second slope,
wherein the relative phase compensation equation is set to determine compensation weight information by multiplying the first slope minus the second slope by the reference temperature minus a detected temperature x, and determine the relative phase compensation information as a sum of a relative phase between the first reception channel and the second reception channel at the detected temperature and the compensation weight information, wherein the reference temperature is determined as a temperature detected consistently for a predetermined period of time or a temperature detected at the highest frequency for a predetermined period of time.

2. The radar control device of claim 1, wherein the controller extracts at least two (temperature, phase) ordered pair information about an absolute phase at the detected temperature x of each reception channel based on the reception signal and the temperature sensing information, and
wherein the slope determination equation is set to determine a temperature matrix and a phase matrix based on the (temperature, phase) ordered pair information and determine a slope based on a product of a pseudo-inverse matrix of the temperature matrix and the phase matrix.

3. The radar control device of claim 1, wherein the controller determines the relative phase compensation information between the first reception channel and the second reception channel based on a first absolute phase of the first reception channel and a second absolute phase of the second reception channel.

4. The radar control device of claim 3, wherein the controller determines a third absolute phase of the first reception channel based on a difference between the reference temperature and a temperature detected through the temperature sensing information and determines a fourth absolute phase of the second reception channel based on the difference between the reference temperature and the temperature detected through the temperature sensing information.

5. The radar control device of claim 4, wherein the controller determines the relative phase compensation information between the first reception channel and the second reception channel based on a difference between the third absolute phase and the fourth absolute phase.

6. A radar control method, comprising:
a signal transmission/reception step transmitting a transmission signal through each transmission channel including a first transmission channel and a second transmission channel, receiving a reception signal of the transmission signal, reflected by a target, through each reception channel including a first reception channel and a second reception channel, and receiving temperature sensing information from a temperature sensor;
a temperature detection step detecting a temperature of a radar control device using the temperature sensing information; and
a relative phase compensation step determining relative phase compensation information between the first reception channel and the second reception channel, which is a relative phase between the first reception channel and the second reception channel at a reference temperature,
wherein a relative phase compensation step includes determining a first slope and a second slope regarding a phase variation according to a temperature change in each of the first reception channel and the second reception channel, based on a slope determination equation,
wherein a relative phase compensation step includes determining the relative phase compensation information between the first reception channel and the second reception channel based on a relative phase compensation equation, the first slope, and the second slope, wherein the relative phase compensation equation is set to determine compensation weight information by multiplying the first slope minus the second slope by the reference temperature minus a detected temperature x, and determine the relative phase compensation information as a sum of a relative phase between the first reception channel and the second reception channel at the detected temperature and the compensation weight information, wherein the reference temperature is determined as a temperature detected consistently for a predetermined period of time or a temperature detected at the highest frequency for a predetermined period of time.

7. The radar control method of claim 6, wherein the relative phase compensation step extracts at least two (temperature, phase) ordered pair information about an absolute phase at a detected temperature x of each reception channel based on the reception signal and the temperature sensing information, and wherein the slope determination equation is set to determine a temperature matrix and a phase matrix based on the (temperature, phase) ordered pair information and determine a slope based on a product of a pseudo-inverse matrix of the temperature matrix and the phase matrix.

8. The radar control method of claim 6, wherein the relative phase compensation step determines the relative phase compensation information between the first reception channel and the second reception channel based on a first absolute phase of the first reception channel and a second absolute phase of the second reception channel.

9. The radar control method of claim 8, wherein the relative phase compensation step determines a third absolute phase of the first reception channel based on a difference between the reference temperature and a temperature detected through the temperature sensing information and determines a fourth absolute phase of the second reception channel based on the difference between the reference temperature and the temperature detected through the temperature sensing information.

10. The radar control method of claim 9, wherein the relative phase compensation step determines the relative phase compensation information between the first reception channel and the second reception channel based on a difference between the third absolute phase and the fourth absolute phase.

* * * * *